Feb. 6, 1945. R. J. ANSCHICKS 2,369,005
RELIEF VALVE
Filed April 15, 1943  2 Sheets-Sheet 1
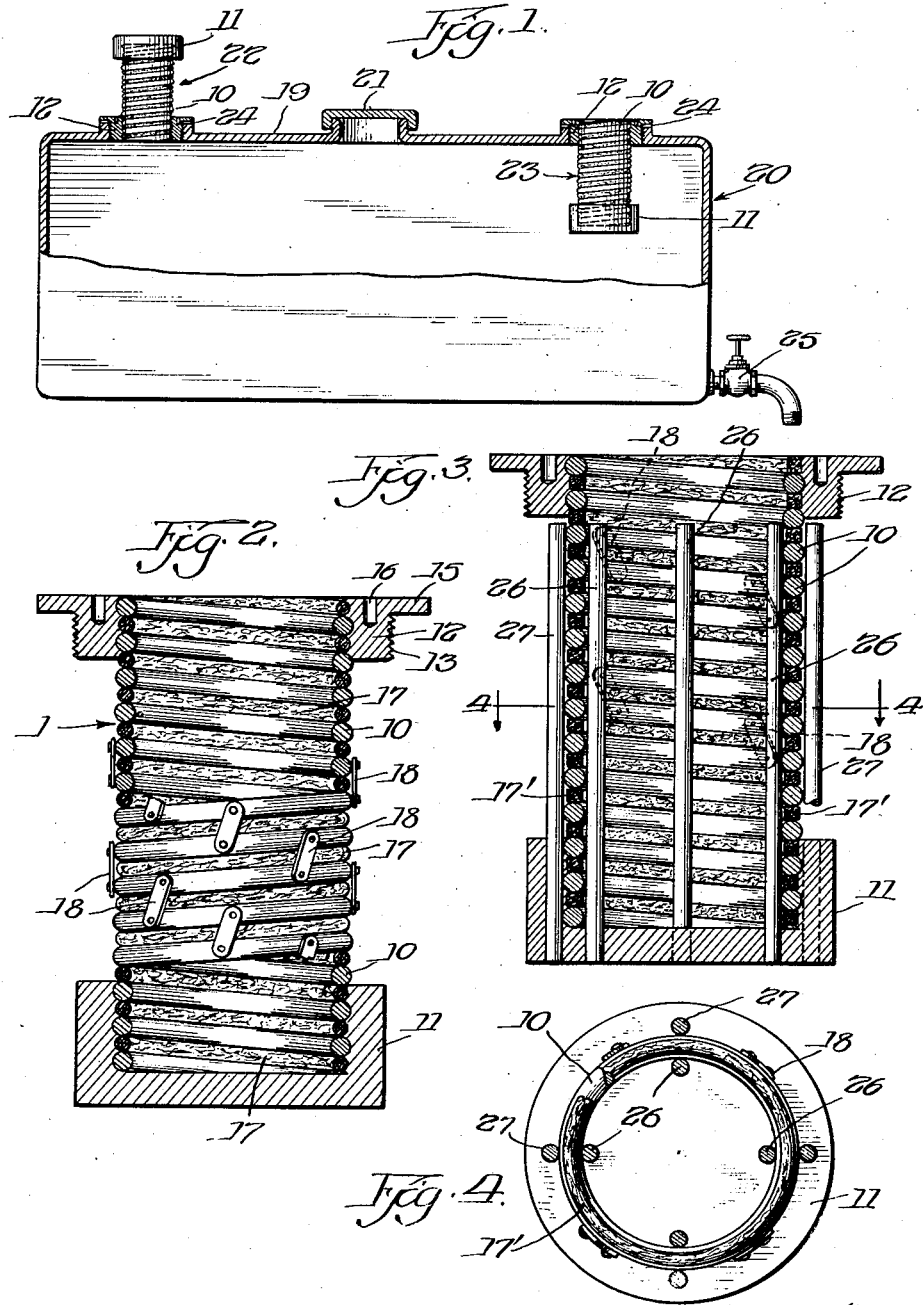
Inventor:
Rudolph J. Anschicks Feb. 6, 1945.  R. J. ANSCHICKS  2,369,005
RELIEF VALVE
Filed April 15, 1943  2 Sheets-Sheet 2
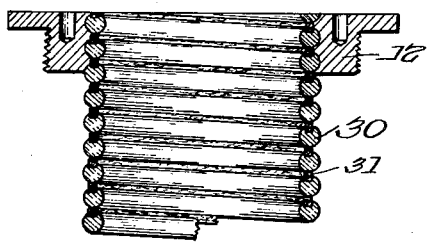
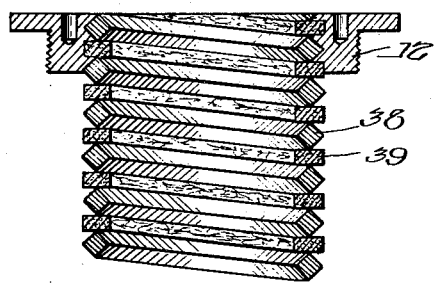
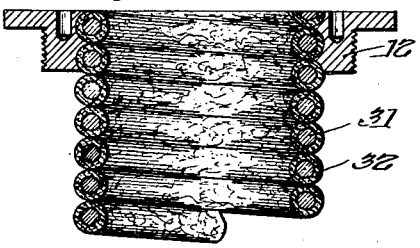
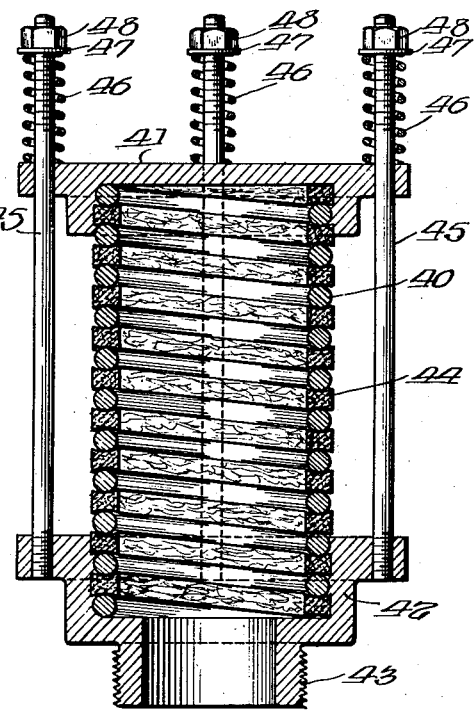
Inventor:
Rudolph J. Anschicks.

Patented Feb. 6, 1945

2,369,005

UNITED STATES PATENT OFFICE 2,369,005

RELIEF VALVE

Rudolph J. Anschicks, Chicago, Ill., assignor to Protectoseal Company of America, Inc., Chicago, Ill., a corporation of Illinois Application April 15, 1943, Serial No. 483,113

14 Claims. (Cl. 137—53)

My invention relates to closure devices and more particularly to valve devices such as pressure or vacuum relief valves, check valves, fire baffles and the like, for the control of the passage of fluid between communicating spaces.

The valves are particularly applicable and desirable for use as closures on tanks, containers, conduits, etc., in connection with the storage or handling of volatile and inflammable fluids, that is, as a pressure or vacuum relief valve. The same is particularly applicable for the uses mentioned since the same provides a combined relief valve and fire baffle, and may be constructed to be very sensitive to low pressures, but its use is not limited to those enumerated.

The invention has among its objects the production of a closure or valve of the kind described which is simple, of few parts, reliable, durable, inexpensive, efficient and satisfactory for use in numerous different installations. It has particularly as an object an improved valve or closure which is adapted to function and control the passage of fluid by force within itself, whether operating as a pressure or vacuum relief valve.

In the preferred embodiments of the closure the same is in the form of a tubular helical spring providing a chamber closed at one end and open at the other end and arranged for attachment to a cooperating part and to communicate with an opening or port through the part, the same being disposed to provide a control for the passage of fluid through the port from one space to the other. The closure or valve provides for a plurality of valve seats or rather an extended or elongated continuous valve and seat for an extended length or area.

A further object of the invention is the production of a novel valve construction which is entirely dependable in service, which will not be inoperative due to corrosion and sticking together of parts and which, due to the seating of the coils and the twisting action in opening or closing, will readily separate or pull the coils apart and tear itself loose when opening up. Likewise in seating, the slight circumferential movement of the coils when closing has a tendency to seat them firmly on each other or on a separating gasket.

Among its further objects is the production of a valve of the type shown in combination with a gasket of helical formation corresponding with the helical formation of a spring and concentric therewith which provides a double seat for or between adjacent coils.

A further object of the invention is the production of a device in which the relative movement of the valve member coils during operation is controlled, thereby controlling the area of the openings between the coils through which the fluid passes. Another object is the provision of means for accomplishing an adjustment of the spring tension.

A further object is the production of a valve of the kind described provided with means for retaining the coils against relative lateral displacement as well as maintaining the gasket against displacement where gaskets are employed.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a sectional view of a container provided with a pressure relief valve and a vacuum relief valve;

Fig. 2 is an enlarged sectional view partially in elevation illustrating the construction of the valves shown in Fig. 1.

Fig. 3 is a similar view illustrating another embodiment of the invention and including means for preventing the lateral displacement of the coils and gasket;

Fig. 4 is a sectional view on line 4—4 of Fig. 3;

Fig. 5 is a sectional view illustrating a modified form of gasket;

Fig. 6 is a similar view illustrating another form;

Fig. 7 is a view of a portion of a device showing a modified arrangement for limiting the separation of the coils;

Figs. 8 and 9 are similar views illustrating another type of construction; and

Fig. 10 is a view similar to the other figures but illustrating a modified construction in which supplemental springs are employed.

Referring to the drawings in which several embodiments of my invention are shown, my improved device may be generally described as a valve for controlling the passage of fluid between communicating spaces, the same consisting of a helical or coiled spring provided with means for closing one end and with means for securing the device in operative relation with a suitable support. The several coils of the spring form substantially an elongated helical valve member which when expanded or extended will permit the passage of fluid between the coils, and which when contracted or closed will prevent the passage of the fluid, the direction of flow depending upon the relative pressures within and without the coil.

As illustrated in Figs. 1 and 2, 1 generally designates the valve which is constructed in the form of a spring or helical member 10, the material entering into the helical being a suitable metal or a plastic or any equivalent which may be extended or contracted as required and which will return to a predetermined condition when the pressure is reduced correspondingly. The tension of the spring or helical member is of course such as is desired for the particular application for which the valve is intended and of course depends upon the pressure under which the device will be called upon to operate in service. Some services may require operation under an ounce or so variation in pressure while others vary in pounds. The size and cross sectional area and shape of the material and the material used entering into the helical member may be varied, this to a more or less extent depending upon the material available and the purpose for which the valve is to be employed. The spring or helical member is provided with a cap, closure or disc member 11 at one end closing that end of the helical member, while the opposite end is left open and provided with a suitable member 12 for securing the same in place, as for example, on a wall separating two spaces and provided with a port for the passage of fluid from one space to the other. The connecting member shown in Fig. 2 consists of a part 12 threaded as indicated at 13 to secure the same in place. The particular fitting or member 12 shown in Fig. 2 is provided with a flange 15 and with holes 16 so that it may be engaged by a spanner wrench and secured in place. It should be understood, however, that the device itself may be secured in place in any suitable manner other than that shown and that it may be formed to be engaged by any particular style of wrench desired, this all depending upon the method of securing the same in place.

As illustrated in Fig. 2, 17 represents a gasket or packing member of suitable material which is of helical formation and concentric with the coils 10, the same forming a seat for the adjacent coils 10 as illustrated. I have also illustrated the adjacent coils 10 connected by a series of links 18 of suitable size and material which afford means for limiting the expansion of the spring, thereby limiting or controlling the size of the openings between the coils and gasket or that which may be termed the valve opening. These links are particularly desirable where the valve is used to control the passage of volatile or inflammable material since they limit the action of the spring to maintain a definite size of opening between the coils. They also prevent the spring from extending to a degree sufficient to put a set in the same. These links limit the amount the helical member may be elongated or extended when the device is under an abnormal pressure, and also maintain the gasket in place. As shown, the links are inclined to longitudinal axis of the spring when the helical member is in its normal undistorted or closed position. The elongation of the helical member not only separates adjacent coils but causes slight relative circumferential movement of the separated coils in directions tending to move the links into parallelism with the longitudinal axis of the helical member, so that when the device is fully extended all of the links will be substantially parallel with the axis of the helical member instead of inclined as shown. The links and their application to the adjacent coils may be so designed that the desired maximum spacing may be a predetermined amount, for example, by limiting the opening of the coils to an amount not to exceed approximately 0.03 inch, thereby adapting the device as a flame resistor or baffle since flames due to ignition or gas escaping into or out of the device cannot travel backwardly through the narrow spacing and are quenched by contact with the closely spaced coils.

With this type of valve seat the coils have slight tendency to stick together or freeze due to corrosion or for other reasons along the contacting face and only a small pressure or force is required to overcome the adhesion due to any cause since all of the elongated force may operate at one point to break the adhesion and that point will usually be where the corrosive or other adhesion is at a minimum. As the coil is pulled open at this point the contiguous corroded areas will be progressively separated or forced apart and the force required to thus progressively tear apart the contacting sticking surface is obviously much smaller than that necessary to pull a conventional rigid valve body off its seat to which it adheres, since in order to yield, the entire annular surfaces of the latter must be separated simultaneously.

In Fig. 1 there is shown a tank or receptacle 20, the space within the tank being one space, while at the exterior of the tank is the other space, it being desired that these spaces may communicate but communication prevented as desired. The tank 20 is provided with a closure 21 for filling or otherwise and upon one of the walls, as shown wall 19, are illustrated two of my improved devices, 22 indicating a pressure relief valve and 23 a vacuum relief valve. The connecting member 12 on the vacuum relief valve, indicated generally as 23, is arranged on the helical member as shown in Fig. 2, while on the pressure relief valve designated generally as 22, the member 12 is shown reversed. This figure is intended to show the application of the valve as a pressure or vacuum relief valve, it being understood that only one might be employed, this depending upon the use to which the valve is to be put. Where desired, gaskets 24 may be inserted between the parts to prevent leakage of fluid. Purely for purposes of illustration, I have shown a draw-off valve 25 for the particular tank illustrated which of course may also provide a means for filling the tank when a hose or the like is connected to the same. Withdrawing the contents of the tank would cause the vacuum relief valve 23 to operate, breaking the vacuum, while expansion of the contents of the tank, increasing the internal pressure, would have its pressure relieved by the operation of the valve indicated at 22. Fig. 1 is intended to merely illustrate a use of the device.

The device shown in Figs. 3 and 4 in general is the same as that shown in Fig. 2 except a modified type of gasket 17' is shown. As shown the gasket 17' is square in cross section. However, this figure illustrates the application of guide members 26 and 27 which may be employed for guiding the movement of the coils as well as retaining the gasket or seat 17' in its place. These guides may be placed on the inside or outside of the valve or on both inside and outside as illustrated in Figs. 3 and 4.

In Fig. 5 is illustrated a modified type of helical member and gasket in which 30 represents the coils of the spring or helical member and 31 a suitable gasket which in this instance is seated and maintained in a groove in the coils. The gasket may be of any suitable material, preferably differing from that in the coil itself, and forms a seat for the coil contiguous to the one carrying the gasket. The gasket may be of the desired size and shape, and secured in place by swedging it in the groove, which may be shaped to retain it in place.

Fig. 6 illustrates another form of device in which 31 represents the coils of the spring or helical member and 32 the gasket of suitable material which in this case is in the form of a covering for the coil. Fig. 7 illustrates a modified form of linkage connecting the coils 33. These links 34 span the gasket 35 and connect the coils and function in the same manner as the links 18 shown in Fig. 2. Conveniently the ends of the links 34 may be bent at right angles to their main portions and inserted to holes in the coils 33. In Fig. 8 the device is more or less similar except in this case the gasket 37 between the coils 36 is of a different shape. In Fig. 9 the coil is of a modified cross sectional shape as indicated at 38, provided with edges that will impinge or form its seat in the gasket 39 which ordinarily would be of a softer material.

Referring to Fig. 10, means is provided for varying or controlling the tension of the spring or helical member making up the valve. In this construction 40 represents the coils of the spring, 41 the closure for one end of the spring, and 42 the supporting member which may be constructed as indicated at 43 or in some other satisfactory manner for attachment to a cooperating part. The gasket 44 shown in this figure is of a slightly different cross sectional shape. Links for controlling or limiting the expansion of the spring or means for preventing lateral movement are not shown in this figure, since they are amply disclosed and described in the other figures and are not always used. As shown, the supporting member 42 carries the desired number of rods or guides 45 which extend to and through the closure 41 which is slidable on the rods. Arranged on the rods are supplemental springs 46 which are interposed between the closure 41 and washers 47 and nuts 48. By increasing or decreasing the tension on the springs 46 a control of the expansion of the spring 40 is provided. By increasing the tension on the springs 46, obviously greater pressure within the coils 40 will be required to separate the coils or open the valve.

From the preceding description it will be obvious that I have devised a valve particularly adapted for controlling the passage of fluid between communicating spaces and a valve that is not subject to becoming inoperative through corrosion and freezing of the parts together due to corrosion.

This is particularly important on installations where the controlling pressures permitted are of small amount. For illustration, a large field storage tank with substantial roof spread but being made of relatively light metals where pressure beyond an inch or two of water or a vacuum of that amount would tend to raise the roof or collapse the tank, respectively. Where the breathing of such tanks is controlled by valves, even though these valves originally are built to be moved by slight pressures, a corrosion or sticking, which frequently occurs, causes excessive pressure or vacuum to build up within the container. My invention overcomes the hazard of the conventional valve in that it is less subject to corrosion. In a conventional valve seat the entire perimeter of the valve may be corroded shut, requiring extraordinary pressure to tear the closure away from the seat. In my improved valve the pressure against the closure disc will tend to be applied as a tearing action at minute points progressively breaking up the freezing of the coils.

While a coil spring has been heretofore employed in relation to the control of fluid, there have been limitations in use which preclude a universal application. It is well known that in a coil spring, even though the individual member coils be contiguous to one another and in tight contact, the nature of the seating between the two coils is not fluid tight except under pressure so great as to practically force the material in the coils to adjust themselves to one another which is of course impractical where pressures are comparatively low. In my invention the use of the independent contiguous gasketing helical member, whether that helical member be of soft or relatively hard material, affords a fluid tight joint even though the pressures forming the contact between the controlling elements of the spring and the gasketing elements between be relatively small.

The device has many uses or applications and may be subject to many modifications, depending upon the particular use for which it is intended. Obviously, the materials entering into the valve may be such as are suitable for the purpose, and while ordinarily the helical member or spring would generally be made of suitable spring metal, it is possible to construct a satisfactory device by employing plastics or some equivalent. Likewise the gasket or packing material may be such as is suitable for the purpose. In some instances it may be a special alloy or merely a softer metal than the coil metal, or it may be a soft packing, that is non-metallic packing.

While I have shown a simple arrangement for securing the device to a wall between communicating spaces, I am aware of the fact that some other form of securing means or support for the device and method of securing the same to the wall or support may be readily devised by those skilled in the art.

Having thus described my invention, it is obvious that various immaterial modifications of certain details may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a fluid control device of the kind described, a helical spring provided with a closure at one end and with supporting means at the other end, the coils of the spring constituting an elongated helical valve member, a helically formed gasket interposed between the faces of adjacent coils of the valve member and concentric therewith providing a valve seat for the valve member disposed between adjacent valve member coils, said helical spring and helically formed gasket being movable relative to each other.

2. In a fluid control device of the kind described, a helical spring provided with a closure at one end and with supporting means at the other end, the coils of the spring constituting an elongated helical valve member; a helically formed gasket interposed between the adjacent coils of the valve member and concentric therewith providing a valve seat for the valve member disposed between adjacent valve member coils, and restraining means connecting adjacent coils for limiting the relief movements of the valve member coils relative to each other and controlling the passage of fluid past the valve.

3. In a fluid control device of the kind described, a helical spring provided with a closure at one end and with supporting means at the other end, the coils of the spring constituting an elongated helical valve member, a helically formed gasket interposed between the adjacent coils of the valve member and concentric therewith providing a valve seat for the valve member disposed between adjacent valve member coils, and restraining means connecting adjacent coils for retaining the gasket coils against relative lateral outward displacement.

4. In a device of the kind described consisting of a plurality of helically arranged members connected together with the coils of one disposed between the coils of the other, one member of resilient material under a desired tension for maintaining the coils in a predetermined relationship, the other member of packing material providing a gasket between the coils of the resilient helical member, and restraining means connecting adjacent coils for positively connecting the coils of the resilient member and limiting the relative separation thereof.

5. In a device of the kind described consisting of a plurality of spirally arranged members connected together with the coils of one disposed between the coils of the other, one member of resilient material under a desired tension for maintaining the coils in a predetermined relationship, the other member of yieldable packing material providing a gasket between the coils of the resilient helical member, means for positively connecting the coils of the resilient member and limiting the relative separation thereof, and means for preventing displacement of the gasket.

6. A device of the kind described consisting of a body member providing a chamber, the walls of the body consisting of a helically wound spring, one end of the spring being closed and the other open and arranged for attachment to a cooperating part, and restraining means connecting adjacent coils for securing adjacent coils together and limiting the relative longitudinal and circumferential movements of the coils.

7. A device of the kind described consisting of a body member providing a chamber, the walls of the body consisting of a helically wound spring, one end of the spring being closed and the other open and arranged for attachment to a cooperating part, restraining means for securing adjacent coils together and limiting the relative longitudinal and circumferential movements of the coils, and a helical gasket disposed between the spring coils.

8. A device of the kind described consisting of a body member providing a chamber, the walls of the body consisting of a helically wound spring, one end of the spring closed and the other arranged for attachment to a cooperating part, means for securing adjacent coils together and limiting the relative longitudinal and circumferential movement of the coils, a helical gasket disposed between the spring coils and means for retaining the gasket in place.

9. A device for controlling the passage of fluid between communicating spaces comprising a coiled spring open at one end and provided at said end with means for supporting the same in operative relation for connecting the spaces, with the interior of the spring open to one space and with the exterior disposed in the other space, closure means at the opposite end of the spring operable by pressure differential between the communicating spaces to extend the spring when pressure within the same is greater than the pressure surrounding it, a helical gasket member interposed between the coils of the spring forming a seat therebetween when the spring is contracted, the spring being formed with an initial tension sufficient to normally maintain the spring coils and gasket coils in leak-proof engagement to prevent passage of fluid from one space to the other, and links pivotally connected to adjacent coils for limiting the separation of the coils.

10. In a fluid control device of the kind described, a helical spring provided with a closure at one end and with supporting means at the other end, the coils of the spring constituting an elongated helical valve member, the spaces between the coils providing a continuous open port for the passage of fluid when the spring is extended by a difference of fluid pressure within and without the interior of the spring, and means for controlling the spring tension.

11. A device for controlling the passage of fluid between communicating spaces comprising a coiled spring having closure means at one end and open at the other and provided at the open end with means for supporting the same in one space in operative relation with a port communicating with the other space, and with the interior of the spring at the open end, said closure means at the end of the spring operable by pressure differential between the communicating spaces to extend the spring when pressure within the same is greater than the pressure surrounding it, the spring being formed with an initial tension sufficient to normally maintain the spring coils contracted, and restraining means connecting adjacet coils for limiting the extension of the spring.

12. A device for controlling the passage of fluid between two communicating spaces comprising a coiled spring open at one end for communication with one space and provided at said end with means for supporting the same in operative relation with a port connecting with said space, the opposite end disposed in the other space, closure means at said opposite end of the spring operable by pressure differential between the communicating spaces to extend the spring when pressure within the same is greater than the pressure surrounding it, the spring being formed with an initial tension sufficient to normally maintain the spring coils in a desired contracted relation, means for controlling the extension of the spring, and means for preventing transverse displacement of the spring.

13. A device for controlling the passage of fluid between two communicating spaces comprising a coiled spring open at one end and provided at said end with means in one space for supporting the same in operative relation with a port connecting the spaces of the spring at one end open through the said port to the other space, closure means at the end opposite the open end of the spring, said closure means operable by pressure differential between the communicating spaces to extend the spring when pressure within the spring is greater than the pressure without it, the spring being formed with an initial tension sufficient to normally maintain the spring coils in desired relation, means for controlling the extension of the spring, and supplemental means for controlling the extension and contraction of the spring during operation of the valve.

14. A device for controlling the passage of fluid between two communicating spaces, comprising a coiled spring open at one end and provided at said end with means for supporting the same in operative relation with the spaces with the interior of the spring open at one end to one space, closure means at the other end of said spring operable by pressure differential between the communicating spaces to extend the spring and afford communication between the spaces when pressure within the spring is greater than the pressure surrounding it, a helical gasket member interposed between the coils of the spring and sealing the same when the spring is contracted, the spring being formed with an initial tension sufficient to normally maintain the spring coils and gasket coils in leak-proof engagement, and links pivotally connected to adjacent coils for limiting the separation of the coils.

RUDOLPH J. ANSCHICKS.